UNITED STATES PATENT OFFICE.

RICHARD KIRCHHOFF, OF BERLIN, GERMANY, ASSIGNOR TO ACTIEN GESELLSCHAFT FÜR ANILIN FABRIKATION, OF BERLIN, GERMANY

ORANGE LAKE AND PROCESS OF MAKING SAME.

No. 842,560.  Specification of Letters Patent.  Patented Jan. 29, 1907.

Application filed July 7, 1905. Serial No. 268,727. (Specimens.)

*To all whom it may concern:*

Be it known that I, RICHARD KIRCHHOFF, of Berlin, in the Kingdom of Prussia, German Empire, have invented new and useful Improvements in Orange Lakes and Processes of Making Same; and I do hereby declare that the following is a full, clear, and exact description thereof, which will enable others skilled in the art to which it appertains to make and use the same.

I have discovered that one can obtain valuable orange-color lakes from those mono-azo colors which are produced by combining in the usual manner the diazo compound of an amido-sulfonic acid of the benzene or naphthalene series with ortho-nitrophenol by converting the alkali salts of such an azo color into the salts of an alkaline-earth metal, of an earth metal, or of an other suitable metal. For this purpose the alkali salts of the said dyestuffs are dissolved or suspended in water, and a solution of such a metallic salt—as, for instance, a salt of barium, calcium, strontium, magnesium, or the oxid or hydroxid of one of these metals or a mixture of such compounds—is added either in the cold or while heating. It is preferable to add before or after precipitation a suitable substratum, such as sulfate of calcium, hydroxid of aluminium, or the like. The lakes are then filtered and dried. They possess a clear orange color and are most difficultly soluble or nearly insoluble in water. They also are distinguished by a very great fastness to light.

As coloring-matters which are fit for the purpose of my invention I name, for instance, the following: sulfanilic acid-azo-ortho-nitrophenol, metanilic acid-azo-ortho-nitrophenol, chloranilin sulfonic acid-azo-ortho-nitrophenol, 2.6-naphthylamin sulfonic acid-azo-ortho-nitrophenol.

The following examples may serve to illustrate my invention, the parts being by weight.

Example 1: One hundred parts of a paste containing about twenty per cent. of the sodium salt of the dyestuff obtained by combining the diazo compound of sulfanilic acid with ortho-nitrophenol in soda-alkaline solution are well mixed with two hundred parts of water. After heating this mixture to 80°–90° centigrade it is added with a solution of forty parts of barium chlorid, whereby the mass is to be very well agitated. Some time afterward 800–1,000 parts of a freshly-prepared paste of aluminium hydroxid containing 2–3 per cent. of it are slowly poured in, whereafter agitation while heating is continued for some further time. Then the mass is filtered, pressed, dried, and very finely ground. The lake thus obtained is nearly insoluble in water and has a great body. It produces clear orange tints which possess a very great fastness to light.

Example 2: Dissolve fifty parts of aluminium sulfate in two thousand parts of water, pour in fifteen parts of slaked lime in the form of milk of lime, add two hundred parts of the sodium salt of the dyestuff mentioned in Example 1 dissolved in ten thousand parts of water, and agitate the mass very well. Add a solution of one hundred and fifty parts of barium chlorid in fifteen hundred parts of water and stir the whole for some further time. Then filter, press, and dry. The product shows also a clear orange tint and for the rest has the same properties as that obtained according to Example 1.

From the dyestuff used in the foregoing examples one can also obtain a pure barium lake by precipitating a solution of the sodium salt of the dyestuff only with a barium salt. It results in this way, a lake which is a little more reddish than that obtained according to Example 1, but which possesses likewise a very clear tint and which is absolutely insoluble in water.

According to the method as given in the foregoing examples I may also produce lakes from the other above-named azo colors, as it is obvious that I am not limited to the above examples nor to the details given therein.

Now what I claim is—

1. The process of producing color lakes from the herein-described azo colors derived from the reaction of the diazo compound of aromatic amido sulfonic acids on orthonitrophenol, which consists in precipitating the alkali salts of said azo colors with salts of the alkaline earths in the presence of a suitable substratum.

2. The process of producing color lakes from the herein-described azo colors derived from the reaction of the diazo compound of aromatic amidosulfonic acids on orthonitrophenol, which consists in precipitating the alkali salts of said azo colors with salts of the alkaline earths.

3. The new orange-color lakes prepared by precipitating an alkali salt of the monoazo colors defined in the foregoing specification with salts of the alkaline earths in the presence of a suitable substratum, said lakes being distinguished by a clear orange color, a great insolubility in water and a very great fastness to light, these lakes being split up by the action of a strong reducing agent yielding thereby 2.4-diamido-phenol besides an amidosulfonic acid.

4. The new orange-color lake prepared by precipitating the azo dyestuff: sulfanilic acid - azo - ortho - nitrophenol by means of barium chlorid in the presence of aluminium hydroxid, said lake being a clear orange-colored powder having a great body, practically insoluble in water and insoluble in alcohol, which powder when treated with a hot solution of an alkali is decomposed and converted into the corresponding alkali salt of the said dyestuff, and from which solution of the alkali salt, by a treatment with strong reducing agents, 2.4-diamidophenol is obtained besides sulfanilic acid.

In witness whereof I have hereunto signed my name, this 22d day of June, 1905, in the presence of two subscribing witnesses.

RICHARD KIRCHHOFF.

Witnesses:
　HENRY HASPER,
　WOLDEMAR HAUPT.